United States Patent
Hanson

(10) Patent No.: US 10,632,421 B2
(45) Date of Patent: Apr. 28, 2020

(54) ELECTROSTATIC FLUID INJECTION SYSTEM

(71) Applicants: VOLVO TRUCK CORPORATION, Gothenburg (SE); Benjamin Hanson, Chambersburg, PA (US)

(72) Inventor: Benjamin Hanson, Chambersburg, PA (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 360 days.

(21) Appl. No.: 15/520,114

(22) PCT Filed: Oct. 28, 2014

(86) PCT No.: PCT/US2014/062623
§ 371 (c)(1),
(2) Date: Apr. 19, 2017

(87) PCT Pub. No.: WO2016/068878
PCT Pub. Date: May 6, 2016

(65) Prior Publication Data
US 2017/0320014 A1    Nov. 9, 2017

(51) Int. Cl.
*B01D 53/90* (2006.01)
*F01N 3/20* (2006.01)
(Continued)

(52) U.S. Cl.
CPC ............ *B01D 53/90* (2013.01); *B01D 53/79* (2013.01); *B01D 53/9431* (2013.01);
(Continued)

(58) Field of Classification Search
CPC .... B01D 53/90; B01D 53/79; B01D 53/9431; B01D 53/9454; B01D 2259/80;
(Continued)

(56) References Cited

U.S. PATENT DOCUMENTS

| | | | |
|---|---|---|---|
| 3,503,704 A | * | 3/1970 | Marks .................. B01D 53/62 423/212 |
| 4,150,644 A | | 4/1979 | Masaki et al. |
| 8,245,951 B2 | | 8/2012 | Fink et al. |
| 2004/0209205 A1 | | 10/2004 | Gomez et al. |

(Continued)

FOREIGN PATENT DOCUMENTS

| CN | 101903624 A | 12/2010 |
|---|---|---|
| DE | 102005038757 A1 | 2/2007 |
| WO | 2004079171 A1 | 9/2004 |

OTHER PUBLICATIONS

International Search Report (dated Jan. 22, 2015) for corresponding International App. PCT/US2014/062623.

(Continued)

*Primary Examiner* — Daniel C. McCracken
(74) *Attorney, Agent, or Firm* — Withrow & Terranova, PLLC

(57) ABSTRACT

A fluid injection system includes a mixing chamber locatable in an exhaust gas conduit upstream of a selective catalytic reduction device for providing an exhaust gas flow path and space for receiving injected fluid, an injector with a plurality of bundled capillary tubes each having an inlet configured to receive a fluid for injection into the chamber and an outlet wherein the injector is mounted on the chamber with the tube outlets in fluid communication with the chamber space, a base plate disposed in the chamber spaced from and aligned with the bundled tubes, a voltage supply connected to the tubes and to the base plate for providing a charge to the tubes and to the base plate to create an electric field to the fluid in the tubes, and a valve disposed on a wall of the chamber for at least one of priming and purging of the tubes.

16 Claims, 6 Drawing Sheets

(51) Int. Cl.
*B01D 53/79* (2006.01)
*B01D 53/94* (2006.01)
*B05B 5/025* (2006.01)

(52) U.S. Cl.
CPC ........ *B01D 53/9454* (2013.01); *B05B 5/0255* (2013.01); *F01N 3/2066* (2013.01); *B01D 53/9418* (2013.01); *B01D 2258/012* (2013.01); *B01D 2259/124* (2013.01); *B01D 2259/80* (2013.01); *F01N 2240/04* (2013.01); *F01N 2610/02* (2013.01); *F01N 2610/1453* (2013.01); *Y02T 10/24* (2013.01)

(58) Field of Classification Search
CPC ......... B01D 53/9418; B01D 2258/012; B01D 2259/124; F01N 3/2066; F01N 2610/1453; F01N 2610/02; F01N 2240/04; B05B 5/0255; Y02T 10/24
See application file for complete search history.

(56) References Cited

U.S. PATENT DOCUMENTS

| | | |
|---|---|---|
| 2005/0016507 A1 | 1/2005 | Tamol, Sr. |
| 2006/0101811 A1* | 5/2006 | Linna ................. B01D 53/9495 60/286 |
| 2011/0040147 A1 | 2/2011 | O'Dea et al. |
| 2011/0277630 A1 | 11/2011 | Greenough |
| 2011/0302909 A1 | 12/2011 | Botte |
| 2014/0050644 A1* | 2/2014 | Colannino ........... B01D 53/346 423/235 |
| 2014/0053538 A1 | 2/2014 | Reeves et al. |

OTHER PUBLICATIONS

Written Opinion (dated Jan. 22, 2015) for corresponding International App. PCT/US2014/062623.

Office Action for Chinese Patent Application No. 201480082883.3, dated Oct. 8, 2019, 8 pages.

* cited by examiner

| Phase | Engine Key | Engine Crank | BV₁ | BV₂ | BV₃ |
|---|---|---|---|---|---|
| 1 | Off | Off | Close | Close | Close |
| 2 | On | Off | Close | Open | Open |
| 3 | On | On | Open | Open | Close |
| 4 | On | Off | Close | Close | Open |
| 5 | Off | Off | Close | Close | Close |

ELECTROSTATIC FLUID INJECTION SYSTEM

BACKGROUND

The present disclosure relates to vehicle exhaust systems for treating exhaust gas and more particularly, to systems and methods for improving the NOx reduction of exhaust gas.

In vehicles such as trucks, exhaust gas (which is a combination of gas and particulate matter) is processed in multiple stages prior to being released to the atmosphere as illustrated in FIG. 1. Exhaust from an engine 110 may be processed by a diesel oxidation catalyst (DOC) 120 to remove hydrocarbons, by a diesel particulate filter (DPF) 130 to remove particulate matter, and by a selective catalytic reduction device (SCR) 140 to reduce NOx to Nitrogen gas and water vapor. For the SCR 140 stage, diesel exhaust fluid (DEF) is injected into and mixed with the exhaust upstream of the SCR device 140.

Currently, trucks have an onboard tank that contains DEF. DEF is composed of approximately 32.5% Urea and 67.5% demineralized water. In most DEF injection systems, DEF is delivered through an injector. DEF delivering injectors can be of a plurality of designs which rely on a pressure gradient across an orifice (high pressure in the injector, low pressure on the outside) to atomize the fluid. DEF is injected by applying approximately nine bar pressure to the fluid. The pressure forces the fluid through the orifices into the exhaust where it is then atomized. In other systems, DEF is mixed with compressed air before it enters the injection nozzle to improve atomization.

It is desirable to have smaller droplet sizes (of the DEF) during atomization to increase the efficiency and effectiveness of the after treatment process of the exhaust gas or fluid.

SUMMARY

In accordance with an exemplary embodiment, a fluid injection system comprises: a mixing chamber locatable in an exhaust gas conduit upstream of a selective catalytic reduction device (SCR), the chamber providing a flow path for exhaust gas and a space for receiving an injected fluid; an injector having a plurality of bundled capillary tubes each having an inlet and an outlet wherein the inlet is configured to receive a fluid for injection into the chamber, the injector being mounted on the chamber with the tube outlets in fluid communication with the space in the chamber; a base plate disposed in the chamber spaced from and aligned with the bundled capillary tubes; a voltage supply connected to the tubes and to the base plate wherein the voltage supply provides a charge to the tubes and to the base plate to create an electric field to the fluid in the tubes; and a valve disposed on a wall of the chamber for at least one of priming and purging of the tubes.

In accordance with another exemplary embodiment, a fluid injection method is comprises the steps of: keying on a diesel engine; opening an exit valve and a prime/purge valve of an exhaust chamber associated with the engine; priming a plurality of capillary tubes that inject diesel exhaust fluid (DEF) into the chamber; closing the prime/purge valve; opening an entry valve of the exhaust chamber; cranking the engine on; applying a voltage to the tubes to electrically charge the fluid in the tubes; and drawing the electrically charged fluid into the chamber.

BRIEF DESCRIPTION OF THE DRAWINGS

The several features, objects, and advantages of exemplary embodiments will be understood by reading this description in conjunction with the drawings. The same reference numbers in different drawings identify the same or similar elements. In the drawings:

FIG. 4 illustrates exemplary states of a plurality of valves used in exemplary embodiments.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the exemplary embodiments.

Reference throughout this specification to an "exemplary embodiment" or "exemplary embodiments" means that a particular feature, structure, or characteristic as described is included in at least one embodiment. Thus, the appearances of these terms and similar phrases in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments.

Figure 1:
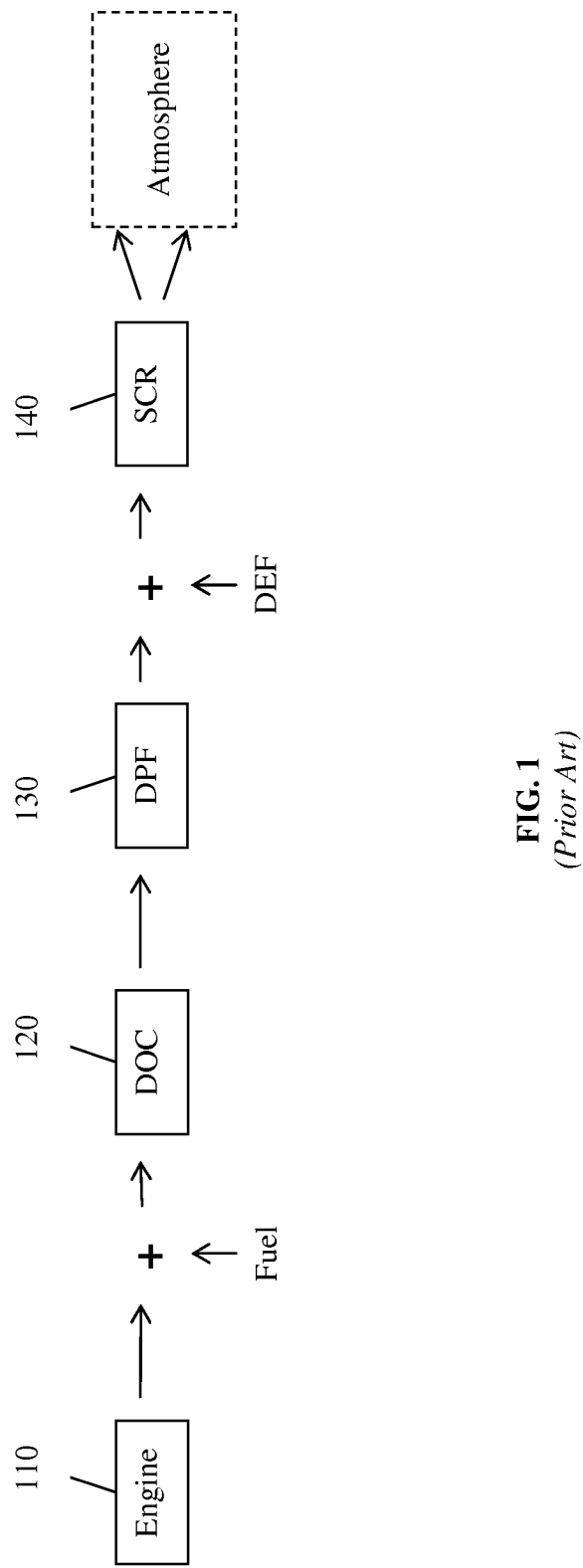
FIG. 1 illustrates schematically a typical exhaust treatment system of a vehicle.
Figure 2A:
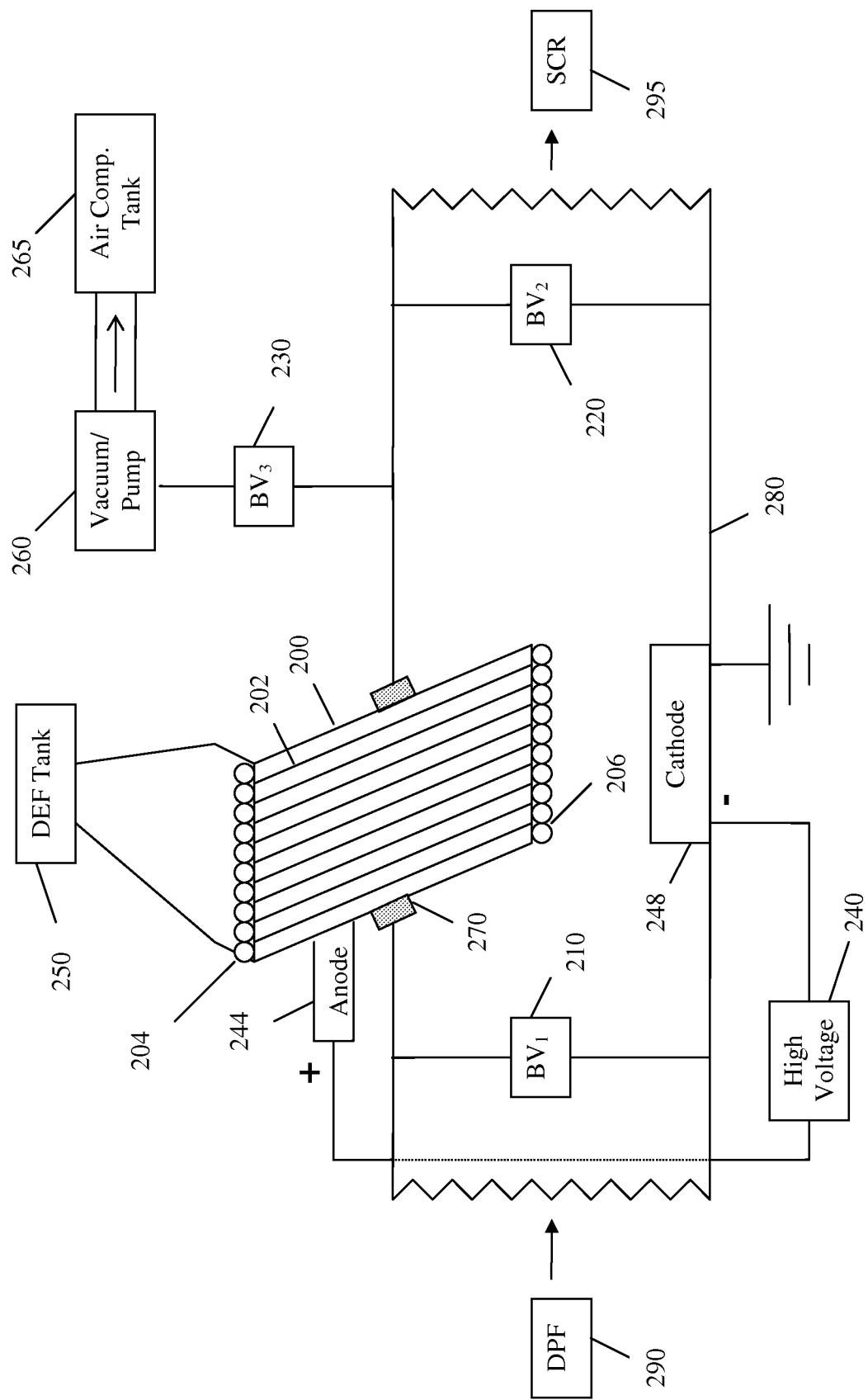
FIGS. 2A and 2B illustrate schematically injection systems in accordance with exemplary embodiments.

According to exemplary embodiments, an injector having a plurality of capillary tubes is disclosed. An exemplary arrangement of an injector 200 is illustrated in FIG. 2A. Injector 200 may include or consist of a plurality of capillary tubes 202 arranged as a bundle. A capillary tube is a thin walled conduit made partly or entirely of conductive material. The tubes are arranged parallel to each other. Each tube 202 may have an inlet 204 and an outlet 206. The inner diameter of the capillary tube may be approximately 0.25 mm but not more than 2.5 mm to utilize capillary action. The term "injector" may be used interchangeably with the terms "bundle" or "capillary tube bundle" within this disclosure.

Diesel exhaust fluid (DEF) may be delivered to an inlet end 204 of each of the capillary tubes 202 from a DEF reservoir or tank 250. An exhaust gas path chamber 280 is located downstream of a DPF 290 and upstream of an SCR 295. The injector 200 is mounted on the chamber 280 with the outlet end 206 of each of the capillary tubes 202 in the chamber 280. The outlets are in fluid communication with an inner portion or interior space of the chamber 280. The diameter of the chamber 280 may vary according to the application under which the aftertreatment system is needed. For example, the inner diameter of the chamber for a large engine (such as that of a truck, for example) will be greater than the inner diameter of the chamber for a passenger vehicle (such as sedan, for example).

A base plate 248 is mounted in the exhaust gas path chamber 280 spaced from and aligned with the tube outlets 206. The base plate 248 may be made of a conductive material and located on an interior surface of the chamber opposite to the outlets. A voltage source 240 may be connected between the base plate 248 and the capillary tube bundle 200. Voltage may be applied to the capillary tube bundle and to the base plate such that the tube bundle forms anode 244 and the base plate becomes a cathode 248. The voltage supply circuit is also grounded as illustrated.

As the liquid enters (and passes through) the tubes 202, the fluid becomes electrically charged and is subjected to the electric field. Coulombic attraction between the anode 244 and cathode 248 draws the charged fluid from the anode through outlets 206 toward the cathode base plate 248. The fluid from outlets 206 becomes atomized within chamber 280 as described below with reference to FIG. 3.

Figure 3:
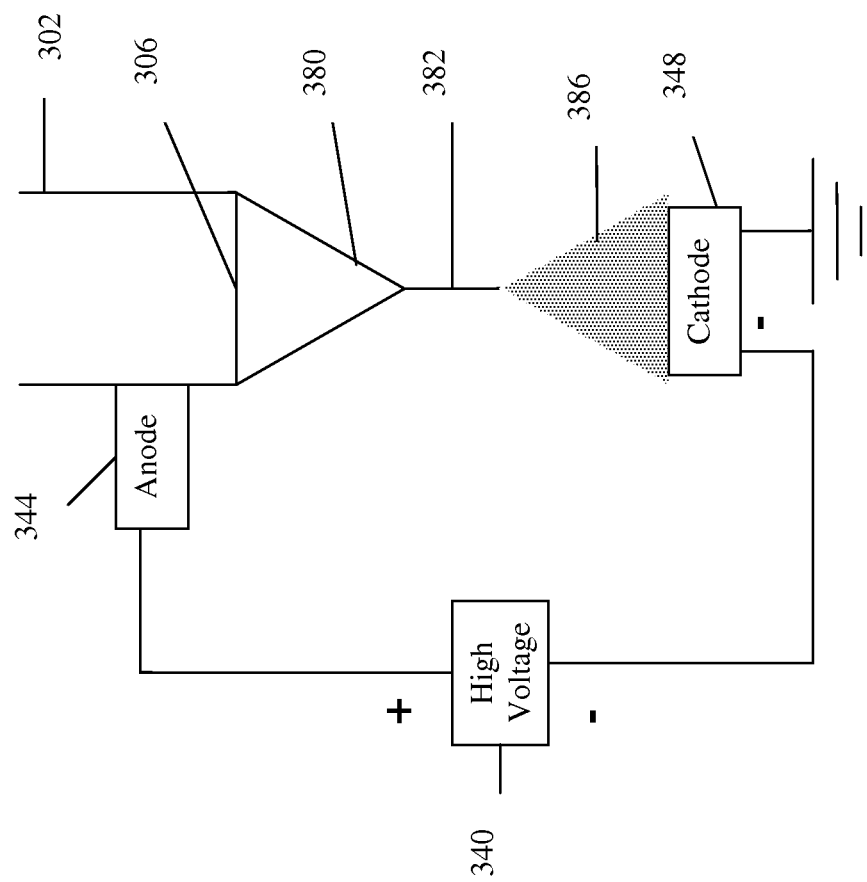
FIG. 3 illustrates an atomization process in accordance with exemplary embodiments.

The atomization of the fluid is illustrated in FIG. 3. As described above, due to coulombic attraction between cathode 348 and anode 344, the charged fluid in tube 302 flows through outlet 306. Due to surface tension, electrostatic and hydrodynamic forces at outlet 306 of capillary tube 302, above a threshold voltage the fluid may form a Taylor cone 380 from which an electrostatic jet of charged fluid 382 emanates.

As the jet 382 gets closer to the cathode, it becomes unstable and atomizes into a plume 386 of charged fluid. The atomized fluid mixes with the exhaust gas flowing through the exhaust gas path chamber (i.e. exhaust gas path chamber 280 of FIG. 2A).

Referring to FIG. 2A, flow of exhaust gas through chamber 280 may be controlled by butterfly valves (BVs) 210 and 220. A first butterfly valve 210 ($BV_1$) upstream of the injector 200 regulates exhaust gas flow from DPF 290 into chamber 280. A second butterfly valve 220 ($BV_2$) downstream of the injector 200 regulates exhaust gas flow which contains exhaust gas mixed with atomized DEF out of mixing chamber 280 into SCR 295. Upon exposure to the heat of the exhaust, the atomized DEF breaks down into $CO_2$ and $NH_3$.

A third butterfly valve 230 ($BV_3$) disposed on a wall of the mixing chamber 280 can regulate flow of air into the mixing chamber. $BV_3$ 230 may be connected to a pressure modifying device, which may be vacuum source or a pump 260 that is connected to an air tank or air compressor 265.

$BV_3$ 230 may selectively prime or purge injector 200 by altering the pressure in chamber 280. $BV_3$ 230 may prime injector 200 by lowering the air pressure in chamber 280 with respect to the atmosphere. Conversely, $BV_3$ 230 may purge injector 200 by raising the air pressure in chamber 280 with respect to the atmosphere.

Figure 2B:
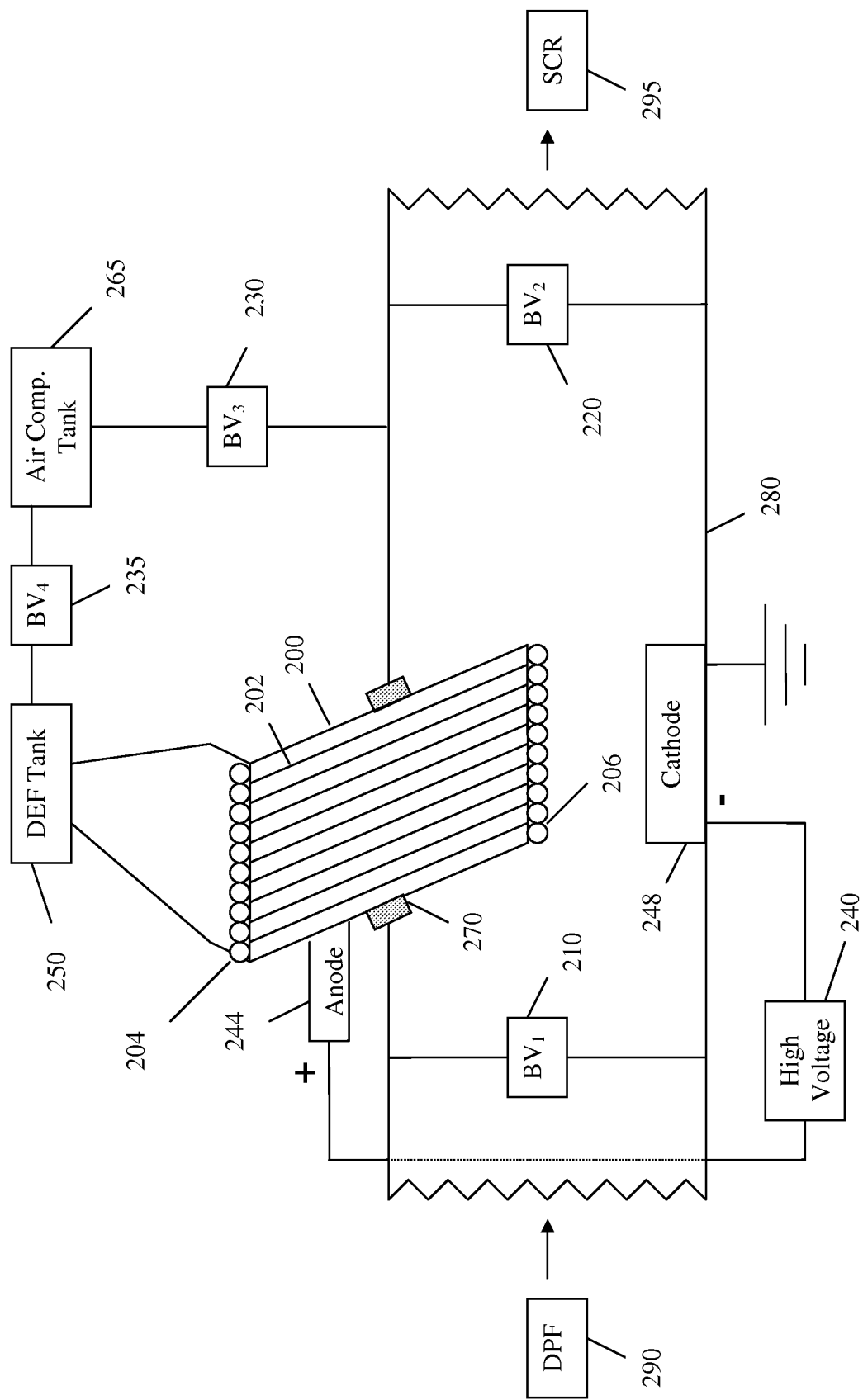

In other embodiments, the injector can also be primed by using air tank 265 to pressurize DEF tank 250 as illustrated in FIG. 2B. This would have the same effect as lowering the pressure in mixing chamber 280. A fourth butterfly valve 235 ($BV_4$) may regulate flow between air tank 265 and DEF tank 250 in this exemplary embodiment.

Referring back to FIG. 2A, when the engine is keyed off and is not cranking (i.e. ignition off and engine off), $BV_1$, $BV_2$ and $BV_3$ are all in a "close" position (i.e. not permitting gas or air flow). This may be referred to as Phase 1.

When the engine is keyed on but is not cranking (i.e. ignition on and engine off), $BV_1$ remains in a "close" position while $BV_2$ is changed to an "open" position. $BV_3$ is changed to an "open" position to prime the injector 200. This may be referred to as Phase 2. The injector 200 may be primed by adjusting the pressure in chamber 280 to a level that is lower than the pressure in the DEF holding tank 250. Priming results in the DEF being drawn from DEF tank 250 into each of the tubes 202 that form injector (or bundle) 200.

As the engine starts cranking and is keyed on (i.e. ignition on and engine on), $BV_1$ is changed to an open position. $BV_2$ remains in the "open" position. $BV_3$ is changed to a "close" position as the injector 200 is primed. This may be referred to as Phase 3. Exhaust from DPF 290 enters chamber 280 and mixes with atomized DEF from injector 200 and exits chamber 280 to SCR 295.

When the engine is not cranking and is still keyed on (i.e. ignition on and engine off), $BV_1$ and $BV_2$ are changed to a "close" position. $BV_3$ is changed to an "open" position to purge the injector 200. This may be referred to as Phase 4. The injector may be purged by adjusting the pressure in chamber 280 to a level that is higher than the pressure in the DEF holding tank 250. Purging results in evacuating the tube bundle 200 of DEF from each of the capillary tubes 202 and forcing it back into DEF tank 250. The removal of DEF from the tubes eliminates the freezing or crystallization of the urea in the tubes.

When the engine is turned off and keyed off (i.e. ignition off and engine off), $BV_1$ and $BV_2$ remain in "close" position and $BV_3$ changes to "close" position. This may be referred to as Phase 5 which is identical to Phase 1.

The position of each of the butterfly valves $BV_1$, $BV_2$ and $BV_3$ as well as the state of engine ignition and engine crank for each phase described above with reference to FIG. 2A is illustrated in table 400 of FIG. 4.

The number of capillary tubes 202 included within a bundle that forms the injector 200 may depend on the amount of DEF needed to effectively treat the exhaust gas as well as packaging constraints. For example, the tube bundle as described herein may include one hundred and sixty (160) individual capillary tubes assuming an optimized circle packing constant of 0.9069 is achieved in order to meet a required DEF flow rate of 2 grams per second for example. A packing constant may be defined as the area used divided by the area available (packing constant=area used/area available).

Other factors that may affect the number of tubes include, but are not limited to, the temperature, pressure, electric field potential (i.e. voltage applied), fluid contaminants, and fluid viscosity. The voltage is applied after the injector has been primed and the injection of DEF is needed or desired.

Figure 5:
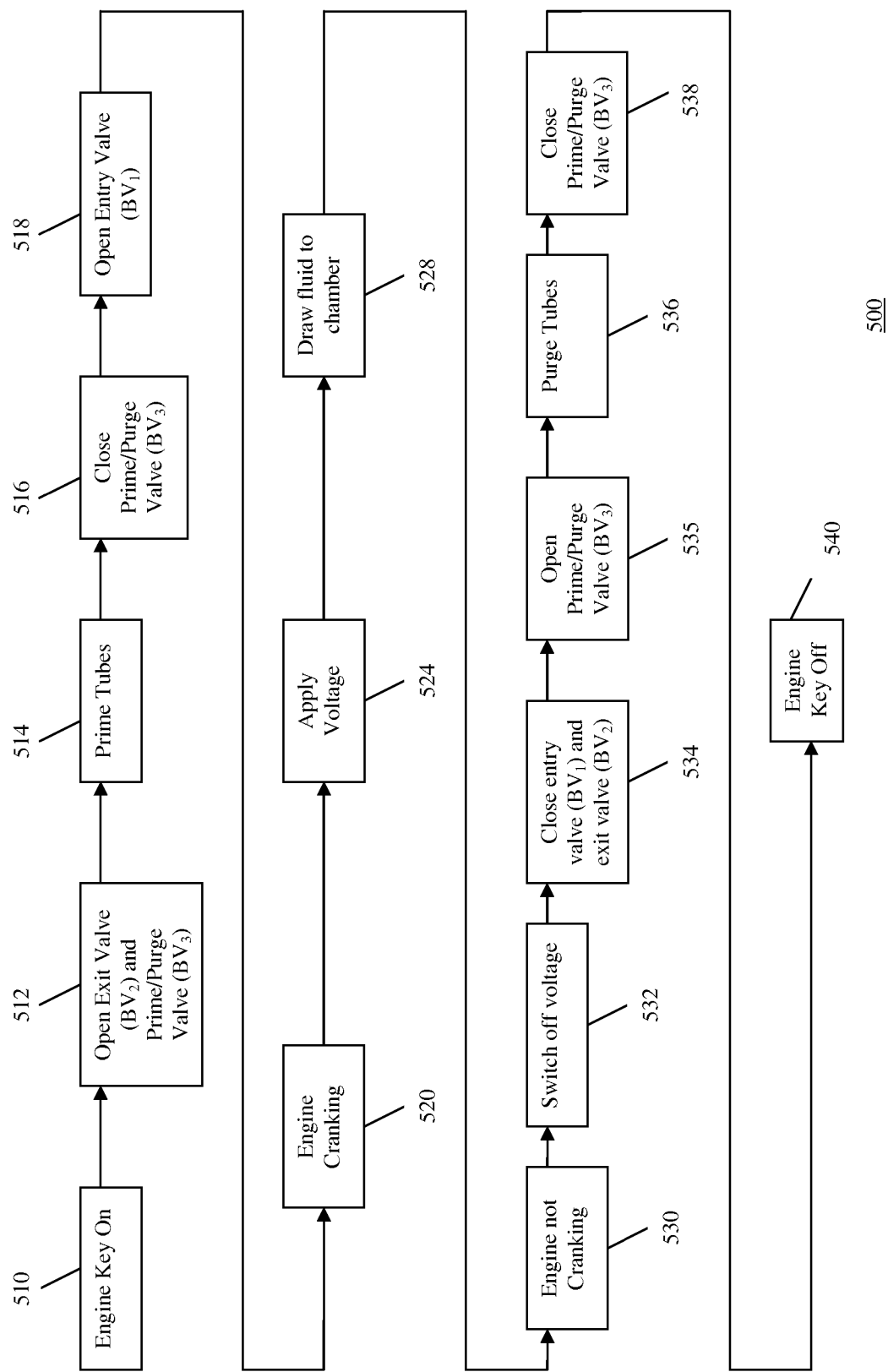
FIG. 5 illustrates a method in accordance with exemplary embodiments.

A method in accordance with exemplary embodiments may be described with reference to FIG. 5. For purposes of describing an exemplary method 500, valve $BV_1$ may be referred to as entry valve, $BV_2$ may be referred to as exit valve and $BV_3$ may be referred to as prime/purge valve.

An engine may be keyed on at step 510 (Phase 2). Exit valve 220 ($BV_2$) and prime/purge valve 230 ($BV_3$) may open at step 512. This allows tubes 200 to be primed at step 514 by reducing air pressure in exhaust chamber 280. The tubes may be primed by drawing fluid from DEF tank 250. The prime/purge valve 230 ($BV_3$) may be closed at step 516. The entry valve 210 ($BV_1$) may be opened at step 518 ($BV_2$ 220 remains open).

The engine may start cranking at step 520 (i.e. Phase 3). A voltage 240 may be applied to injector 200 to charge the fluid at step 524. The charged fluid may be drawn to chamber 280 at step 528.

The engine may be shut off or stop cranking at step 530 (Phase 4). Voltage supply to the tubes 200 may be switched off step 532. Entry valve 210 ($BV_1$) and exit valve 220 ($BV_2$) may be closed at step 534. Prime/purge valve 230 ($BV_3$) may be opened at step 535. Tubes 200 may be purged at step 536. After the injector (made up of the tubes) is purged, prime/purge valve 230 ($BV_3$) may be closed at step 538. The engine may be keyed off at step 540 (Phase 5).

Exemplary embodiments as described herein facilitate the production of an advantageously small droplet size of the atomized diesel exhaust fluid that facilitates the DEF being mixed with the exhaust gas. Droplets having a size (i.e.

diameter) of 1 to 100 micrometers may be formed. Existing systems are not believed capable of producing droplets having such a size. The voltage supply may range between 5 volts (V) to 200 kilovolts (kV). An airless urea dosing system may also be realized utilizing exemplary embodiments. An airless system refers to not using compressed air to facilitate the pressure drop across the injector orifice, i.e. atomization.

Although exemplary embodiments have been disclosed, it will be apparent to those skilled in the art that various changes and modifications can be made which will achieve some of the advantages of embodiments without departing from the spirit and scope of the disclosure. Such modifications are intended to be covered by the appended claims in which the reference signs shall not be construed as limiting the scope.

In the description and the appended claims the meaning of "comprising" is not to be understood as excluding other elements or steps. Further, "a" or "an" does not exclude a plurality, and a single unit may fulfill the functions of several means recited in the claims.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in relevant art.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A fluid injection system comprising:
    a mixing chamber (280) locatable in an exhaust gas conduit upstream of a selective catalytic reduction device (SCR) (295), the mixing chamber providing a flow path for exhaust gas and a space for receiving an injected fluid;
    an injector having a plurality of bundled capillary tubes (202) each having an inlet (204) and an outlet (206) wherein the inlet is configured to receive a fluid for injection into the mixing chamber, the injector being mounted on the mixing chamber with the plurality of bundled capillary tube outlets in fluid communication with the space in the mixing chamber;
    a base plate (248) disposed in the mixing chamber spaced from and aligned with the plurality of bundled capillary tubes;
    a voltage supply (240) connected to the plurality of bundled capillary tubes and to the base plate (248) wherein the voltage supply provides a charge to the plurality of bundled capillary tubes and to the base plate to create an electric field to the fluid in the plurality of bundled capillary tubes; and
    a valve (230) disposed on a wall of the mixing chamber for at least one of priming and purging of the plurality of bundled capillary tubes.

2. The fluid injection system of claim 1, further comprising a supply tank for providing diesel exhaust fluid (DEF) to the injector.

3. The fluid injection system of claim 1, wherein the voltage supply provides a positive charge to the plurality of bundled capillary tubes to form an anode.

4. The fluid injection system of claim 3, wherein the voltage supply provides a negative charge to the base plate to form a cathode.

5. The fluid injection system of claim 4, wherein the voltage supply applies an electric charge to the fluid in a tube of the plurality of bundled capillary tubes.

6. The fluid injection system of claim 5, wherein a coulombic attraction between the cathode and the anode draws the electrically charged fluid from the plurality of capillary bundle tubes into the mixing chamber.

7. The fluid injection system of claim 6, further comprising one of a vacuum or a pressure vessel connected to the valve, the pressure vessel providing adjustability of pressure within the mixing chamber wherein a positive pressure primes the plurality of bundled capillary tubes and a negative pressure purges the plurality of bundled capillary tubes.

8. The fluid injection system of claim 7, further comprising an entry valve for permitting the exhaust gas to flow into the mixing chamber.

9. The fluid injection system of claim 8, further comprising an exit valve for permitting the exhaust gas to flow out of the mixing chamber.

10. The fluid injection system of claim 1, wherein each of the plurality of bundled capillary tubes are parallel to each other and form a bundle.

11. The fluid injection system of claim 1, wherein the plurality of bundled capillary tubes project into the mixing chamber.

12. A method for injecting fluid comprising the steps of:
    keying on a diesel engine comprising the fluid injection system of claim 1;
    opening an exit valve and a prime/purge valve of an exhaust chamber associated with the diesel engine;
    priming a plurality of capillary tubes that inject diesel exhaust fluid (DEF) into the exhaust chamber;
    closing the prime/purge valve;
    opening an entry valve of the exhaust chamber;
    cranking the diesel engine on;
    applying a voltage to the plurality of capillary tubes to electrically charge the DEF in the plurality of capillary tubes; and,
    drawing the electrically charged DEF into the exhaust chamber.

13. The method of claim 12, comprising:
    switching off the diesel engine;
    switching off the voltage to the plurality of capillary tubes;
    closing the entry and exit valves;
    opening the prime/purge valve;
    purging the DEF from the plurality of capillary tubes;
    closing the prime/purge valve; and
    keying off the diesel engine.

14. The method of claim 12, further comprising:
    positively charging the plurality of capillary tubes by the applied voltage to form an anode.

15. The method of claim 14, further comprising:
negatively charging a base plate located within the exhaust chamber by applying the applied voltage to form a cathode.

16. The method of claim 15, further comprising:
drawing the electrically charged DEF from the anode to the cathode by coulombic attraction.

* * * * *